United States Patent
Wang

(10) Patent No.: US 10,734,832 B2
(45) Date of Patent: Aug. 4, 2020

(54) METHOD AND TERMINAL FOR WIRELESS CHARGING

(71) Applicant: BEIJING XIAOMI MOBILE SOFTWARE CO., LTD., Beijing (CN)

(72) Inventor: Yanteng Wang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 190 days.

(21) Appl. No.: 16/048,566

(22) Filed: Jul. 30, 2018

(65) Prior Publication Data

US 2019/0036372 A1  Jan. 31, 2019

(30) Foreign Application Priority Data

Jul. 31, 2017 (CN) .......................... 2017 1 0641294

(51) Int. Cl.
*H02J 7/04* (2006.01)
*H02J 7/02* (2016.01)
(Continued)

(52) U.S. Cl.
CPC .............. *H02J 7/045* (2013.01); *G05F 1/577* (2013.01); *G06F 1/26* (2013.01); *H02J 7/0077* (2013.01);
(Continued)

(58) Field of Classification Search
CPC ...................................................... H02J 7/045
(Continued)

(56) References Cited

U.S. PATENT DOCUMENTS

2012/0058805 A1  3/2012  Yoo
2012/0293009 A1  11/2012  Kim
(Continued)

FOREIGN PATENT DOCUMENTS

CN  101640438 A  2/2010
CN  103700044 A  4/2014
(Continued)

OTHER PUBLICATIONS

International Search Report and Written Opinion issued in corresponding PCT/CN2017/105461, dated May 2, 2018, 8 pages.
(Continued)

*Primary Examiner* — Edward Tso
*Assistant Examiner* — Ahmed H Omar
(74) *Attorney, Agent, or Firm* — Arch & Lake LLP

(57) ABSTRACT

A wireless charging method and terminal are disclosed. A voltage threshold supported by power management chip and output voltages supported by a charger and corresponding output current upper limit values are acquired. A voltage conversion coefficient is determined with the voltages and the threshold. A charging request to the charger is sent, which includes requested voltage which is maximum output voltage among the output voltages not higher than a product of the voltage threshold and reciprocal of the voltage conversion coefficient and a requested current being not higher than the output current upper limit value corresponding to the requested voltage. A charging signal is generated under excitation of a signal from the charger. With the voltage conversion coefficient and a current conversion coefficient being the reciprocal of the voltage conversion coefficient, voltage and current conversion is performed on the charging signal to obtain an input signal of the chip.

20 Claims, 10 Drawing Sheets

(51) Int. Cl.
*H02J 50/80* (2016.01)
*H02J 50/10* (2016.01)
*H02J 7/00* (2006.01)
*G05F 1/577* (2006.01)
*G06F 1/26* (2006.01)
*H02J 50/60* (2016.01)

(52) U.S. Cl.
CPC .............. *H02J 7/025* (2013.01); *H02J 50/10* (2016.02); *H02J 50/80* (2016.02); *H02J 7/00034* (2020.01); *H02J 50/60* (2016.02)

(58) Field of Classification Search
USPC ........................................................ 320/108
See application file for complete search history.

(56) References Cited

U.S. PATENT DOCUMENTS

| | | |
|---|---|---|
| 2016/0372963 A1 | 12/2016 | Sankar |
| 2016/0380439 A1 | 12/2016 | Shao |
| 2017/0179757 A1 | 6/2017 | Kung et al. |

FOREIGN PATENT DOCUMENTS

| | | |
|---|---|---|
| CN | 103852631 A | 6/2014 |
| CN | 104113119 A | 10/2014 |
| CN | 204761169 U | 11/2015 |
| CN | 105826979 A | 8/2016 |
| CN | 105978101 A | 9/2016 |
| CN | 106532834 A | 3/2017 |
| EP | 2728705 A2 | 5/2014 |
| EP | 3185387 A1 | 6/2017 |
| JP | 2013230007 A | 11/2013 |
| JP | 2015006068 A | 1/2015 |
| JP | 2018523448 A | 8/2018 |
| RU | 2614575 C2 | 3/2017 |
| WO | 2014167171 A1 | 10/2014 |

OTHER PUBLICATIONS

First Office Action in Chinese Application No. 201710641294.X, dated May 29, 2019, and English translation (18p).
First Office Action in Russian Application No. 2018140043/08(066574), dated Jul. 1, 2019, and English translation (12p).
European Extended Search Report issued in corresponding EP Patent Application No. 18181677.8, dated Nov. 30, 2018, 10 pages.
First Office Action issued to Japanese Application No. 2018-548123 dated Nov. 26, 2019, (10p).

METHOD AND TERMINAL FOR WIRELESS CHARGING

CROSS-REFERENCE TO RELATED APPLICATIONS

This application is based upon and claims priority to Chinese Patent Application No. 201710641294.X, filed on Jul. 31, 2017, the entire content of which is incorporated herein by reference for all purposes.

TECHNICAL FIELD

The present disclosure generally relates to the field of communications, and more particularly, to a method and terminal for wireless charging.

BACKGROUND

Along with development of wireless charging technologies, more and more terminals including various wearable equipment and intelligent terminals start to use the wireless charging technologies. Typically, a charged terminal, as a wireless charging receiver, converts a wireless signal sent from a wireless charging transmitter into a corresponding charging signal. The charging signal provides an input signal of a power management chip to enable the power management chip to charge a battery of the terminal.

SUMMARY

The present disclosure provides a method, a terminal and non-transitory computer readable medium for wireless charging.

According to a first aspect of the present disclosure, a method for wireless charging is provided. The method may include: acquiring, by a terminal, a voltage threshold supported by a power management chip, a plurality of output voltages supported by a wireless charger, and output current upper limit values of the wireless charger, where each of the output current upper limit values corresponds to one of the output voltages; determining, by the terminal, a voltage conversion coefficient according to the plurality of output voltages and the voltage threshold, and sending a charging request to the wireless charger, where the charging request may include a requested voltage and a requested current, where the requested voltage is a maximum output voltage among the output voltages which are not higher than a product of the voltage threshold and a reciprocal of the voltage conversion coefficient, and the requested current is not higher than the output current upper limit value corresponding to the requested voltage.

The method may also include generating, by the terminal, a charging signal under excitation of a wireless signal output from the wireless charger, and performing, according to the voltage conversion coefficient and a current conversion coefficient, conversion of voltage and current on the charging signal to obtain an input signal of the power management chip, where the charging signal may have a voltage that is the requested voltage, and the current conversion coefficient is a reciprocal of the voltage conversion coefficient.

According to a second aspect of the present disclosure, a terminal is provided. The terminal includes a processor; and a memory arranged to store an instruction executable by the processor, where the processor may be arranged to: acquire, by a terminal, a voltage threshold supported by a power management chip, a plurality of output voltages supported by a wireless charger, and output current upper limit values of the wireless charger, where each of output current upper limit values corresponds to one of the output voltages; and determine, by the terminal, a voltage conversion coefficient according to the plurality of output voltages and the voltage threshold, and sending a charging request to the wireless charger, where the charging request comprises a requested voltage and a requested current, where the requested voltage is a maximum output voltage among the output voltages which are not higher than a product of the voltage threshold and a reciprocal of the voltage conversion coefficient, and the requested current is not higher than the output current upper limit value corresponding to the requested voltage.

The processor may be further arranged to generate, by the terminal, a charging signal under excitation of a wireless signal output from the wireless charger, and performing, according to the voltage conversion coefficient and a current conversion coefficient, conversion of voltage and current on the charging signal to obtain an input signal of the power management chip, where the charging signal has a voltage that is the requested voltage, and the current conversion coefficient is a reciprocal of the voltage conversion coefficient.

According to a third aspect of the present disclosure, a non-transitory computer-readable storage medium is provided. The non-transitory computer-readable storage medium may store a computer program that may be executed by a processor to implement acquiring, by a terminal, a voltage threshold supported by a power management chip, a plurality of output voltages supported by a wireless charger, and output current upper limit values of the wireless charger, where each of the output current upper limit values corresponds to one of the output voltages; determining, by the terminal, a voltage conversion coefficient according to the plurality of output voltages and the voltage threshold, and sending a charging request to the wireless charger, where the charging request may include a requested voltage and a requested current, where the requested voltage is a maximum output voltage among the output voltages which are not higher than a product of the voltage threshold and a reciprocal of the voltage conversion coefficient, and the requested current is not higher than the output current upper limit value corresponding to the requested voltage.

The computer program that may be executed by a processor to further implement generating, by the terminal, a charging signal under excitation of a wireless signal output from the wireless charger, and performing, according to the voltage conversion coefficient and a current conversion coefficient, conversion of voltage and current on the charging signal to obtain an input signal of the power management chip, where the charging signal has a voltage that is the requested voltage, and the current conversion coefficient is a reciprocal of the voltage conversion coefficient.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

Figure 1A:
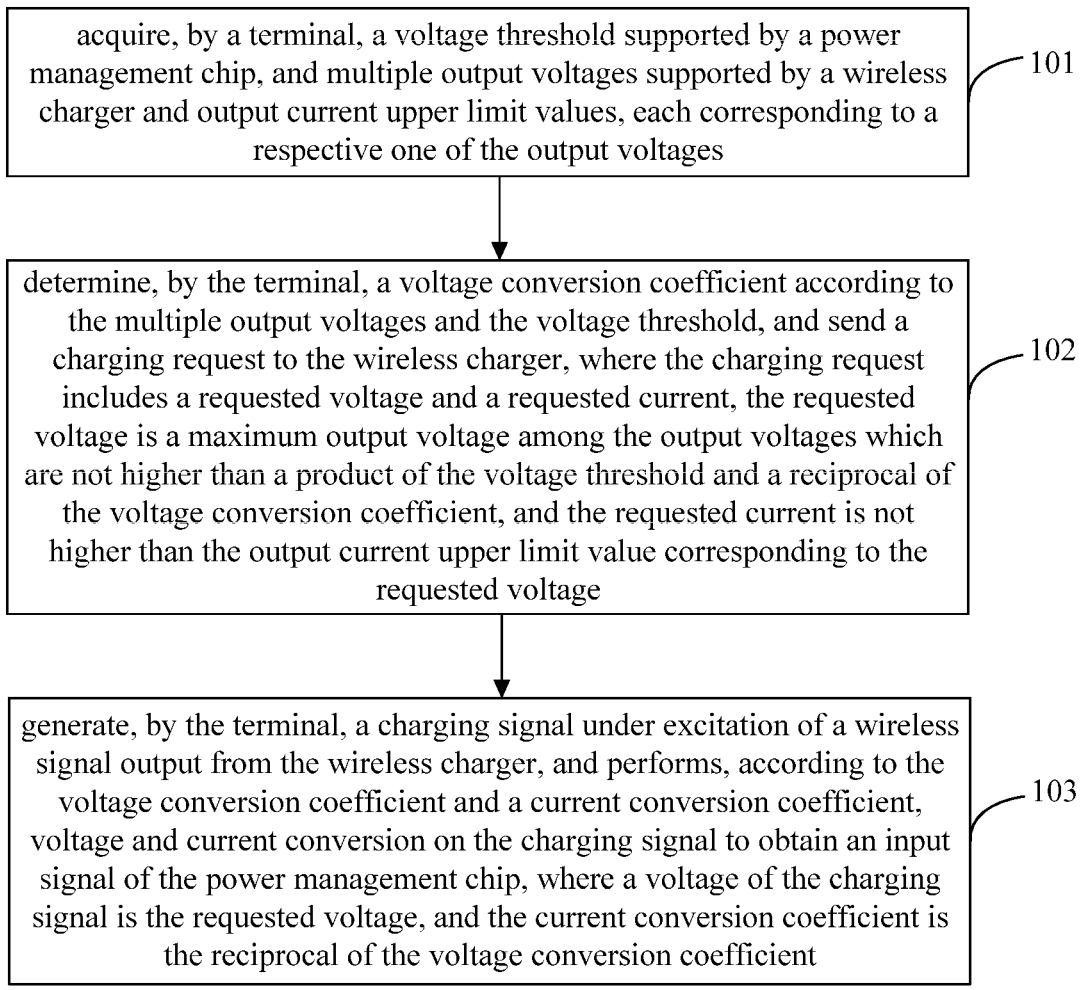
FIG. 1A to FIG. 1D are flow charts showing a method for wireless charging, according to an example.

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

In the wireless charging technology, for improving charging power and efficiency, two solutions may be adopted. According to the first solution, a current of the wireless charging signal is increased while a voltage of the wireless charging signal is kept to be unchanged, thereby increasing the charging power. According to the second solution, an output voltage is increased while the current is kept to be unchanged to realize increase of the power.

However, for the first solution, due to existence of direct current impedance and alternating current impedance of a receiving coil of the terminal, the coil may be seriously heated when the current exceeds a certain threshold, and an effect of increasing the power by continuously increasing the current may be limited. For the second solution, since the power management chip responsible for charging in the terminal has a limited input voltage, increasing the power by increasing the voltage may also be limited. Thus, those two wireless charging solutions cannot effectively realize increase of the power due to the limitation of the receiving coil and power management chip of the terminal.

FIG. 1A is a flow chart showing a method for wireless charging, according to an example. Referring to FIG. 1, the example is described with application of the method for wireless charging to a terminal as an example. The method for wireless charging may include the following steps.

In Step 101, a terminal acquires a voltage threshold supported by a power management chip, and multiple output voltages supported by a wireless charger and output current upper limit values, each corresponding to a respective one of the output voltages.

In Step 102, the terminal determines a voltage conversion coefficient according to the multiple output voltages and the voltage threshold, and sends a charging request to the wireless charger. The charging request includes a requested voltage and a requested current. The requested voltage is a maximum output voltage among the output voltages which are not higher than a product of the voltage threshold and a reciprocal of the voltage conversion coefficient. The requested current is not higher than the output current upper limit value corresponding to the requested voltage.

In Step 103, the terminal generates a charging signal under excitation of a wireless signal output from the wireless charger, and performs, according to the voltage conversion coefficient and a current conversion coefficient, voltage and current conversion on the charging signal to obtain an input signal of the power management chip. A voltage of the charging signal is the requested voltage, and the current conversion coefficient is the reciprocal of the voltage conversion coefficient.

In practice, the terminal may be any piece of equipment supporting wireless charging, for example, an intelligent mobile phone, a personal computer and a tablet computer. The wireless charger may be any piece of equipment capable of outputting a wireless signal arranged for wireless charging. For example, the wireless charger may include a charger and a wireless sender coupled to the charger. The wireless sender may be operated by the charger to output the wireless signal arranged for wireless charging.

For example, in a practical scenario: the solution may be applied to different wireless charging technologies, for example, a magnetic induction-based wireless charging technology and a magnetic resonance-based wireless charging technology. For example, in the magnetic induction-based wireless charging technology, power of a wireless signal for charging is usually below 15 W. For improving charging efficiency, the power of the wireless signal is required to be increased, and the signal power usually depends on a product of a voltage and current output from a wireless charger.

In the solution, when wireless charging is required, a wireless charging receiver, for example, the terminal, acquires the voltage threshold supported by its own power management chip, and different output voltages supported by the wireless charger and output current upper limit values, each corresponding to a respective one of the output voltages. For example, if a voltage threshold acquired by a certain terminal and supported by its own voltage management chip is 10V and a certain wireless charger supports output of three levels, i.e. 5V/3 A, 9V/2 A and 20V/1 A, the terminal determines the voltage conversion coefficient according to the acquired voltage threshold and the output voltages.

The voltage conversion coefficient may be preset here. The voltage conversion coefficient may not be larger than 1. In combination with the example, in case of the voltage conversion coefficient being ½, the terminal sends the charging request to the wireless charger. The charging request includes the requested voltage and the requested current, where a magnitude of the requested voltage depends on the maximum value of the product of the voltage threshold and the reciprocal of the voltage conversion coefficient. In combination with the example, the product of the voltage threshold 10V and the reciprocal 2 of the voltage conversion coefficient is 20V, and the maximum output voltage in the output supported by the wireless charger is 20V, and does not exceed the product, so that the requested voltage is determined to be 20V.

Where, a solution for determining the requested current may refer to a solution for determining the requested current in a wireless charging solution. Specifically, the requested current in the solution does not exceed the current upper limit value 1 A corresponding to the output voltage 20V. After sending the charging request, the terminal may generate the charging signal under excitation of the wireless signal output from the wireless charger, and converts the voltage and current of the charging signal to obtain the input signal meeting a requirement of the power management chip according to the voltage conversion coefficient and the current conversion coefficient forming a reciprocal relationship with the voltage conversion coefficient.

In combination with the example, the input signal of which the voltage is not higher than 10V and which meets the requirement of the power management chip and has relatively high power, is obtained by multiplying the voltage of the charging signal by the voltage conversion coefficient of ½ and multiplying the current of the charging signal by the current conversion coefficient of 2, so as to implement high-power quick charging.

Figure 1B:
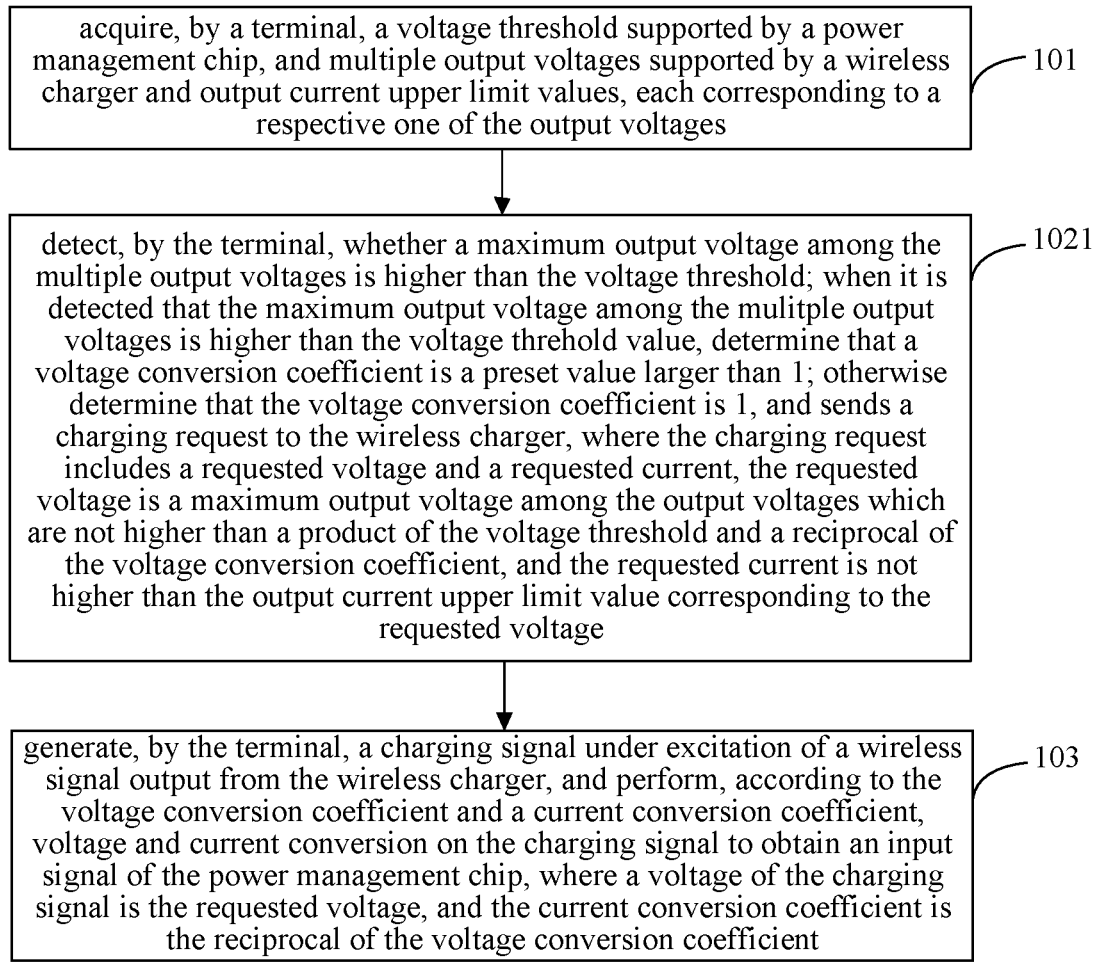

Whether conversion is required to be performed may be determined according to output power supported by the wireless charger and the voltage threshold supported by the power management chip. Correspondingly, as shown in FIG. 1B, FIG. 1B is a flow chart showing a method for wireless charging, according to another example. Based on of the implementation mode shown in FIG. 1A, the action that the terminal determines the voltage conversion coefficient according to the multiple output voltages and the voltage threshold in Step 102 may include the following step.

In Step 1021, the terminal detects whether the maximum output voltage among the multiple output voltages is higher than the voltage threshold. When it is detected that the maximum output voltage among the multiple output voltages is higher than the voltage threshold, it is determined that the voltage conversion coefficient is a preset value smaller than 1, otherwise it is determined that the voltage conversion coefficient is 1.

Specifically, when the wireless charger supports high-power output, the power of the charging signal generated by the terminal under excitation of the wireless signal output from the wireless charger is also relatively high, the voltage of the charging signal in the solution is relatively high. When the voltage of the charging signal exceeds the voltage threshold supported by the power management chip, voltage conversion is required to be performed on the charging signal according to a certain conversion ratio to make the voltage of the signal subjected to voltage conversion not higher than the voltage threshold. Meanwhile, current conversion is performed on the charging signal according to an opposite conversion ratio to keep the characteristic of high power of the converted signal. Therefore, the input signal of the power management chip is obtained.

More specifically, when the wireless charger only supports low-power output, the power of the charging signal generated by the terminal under excitation of the wireless signal output from the wireless charger is also relatively low, and is usually within a voltage requirement range of the power management chip, and correspondingly, for such a signal, when the voltage of the charging signal does not exceed the voltage threshold supported by the power management chip, conversion is not required to be performed, and the charging signal is directly determined as the input signal of the power management chip. Therefore, the input signal of the power management chip is obtained.

In practice, a charge pump may be adopted to perform voltage and current conversion on the charging signal. Specifically, the voltage conversion coefficient may be determined according to the output power of the wireless charger and the voltage threshold of the power management chip, so that power of the input signal obtained by conversion is kept unchanged, and the voltage meets the requirement of the power management chip.

For example, in the practical scenario: the wireless charging sender may use a charger supporting a quick charging technology or a Power Delivery (PD) charger or an ordinary wireless charger. During wireless charging, after certification and detection of the sender and the charged receiver, when it is detected that the sender supports high-voltage quick wireless charging, the receiver applies for a corresponding wireless signal according to the output power supported by the sender, and descriptions will be made still with the condition that the voltage threshold of the power management chip is Vmax=10V as an example.

1) when the sender supports quick charging and supports output of a wireless signal of maximally 12V/2 A, the receiver may regulate the current of the received wireless signal to obtain a charging signal of 12V/1.25 A according to a current magnitude supported by it, the voltage and current conversion is performed on the charging signal at this moment to obtain a signal with a voltage of about 6V and a current of 2.5 A, power of the signal is the same as the power of the charging signal, the voltage is lower than the voltage threshold 10V, and the signal may subsequently be adopted for charging as the input signal 6V/2.5 A (15 W) of the power management chip.

2) If the sender adopts the PD charger and supports output of a wireless signal of maximally 20V for example, 20V/1 A, the receiver may obtain a charging signal of 20V/1 A according to the wireless signal of the sender, voltage and current conversion is performed on the charging signal at this moment to obtain a signal with a voltage of about 10V and a current of 2 A, power of the signal is the same as the power of the charging signal, the voltage does not exceed the voltage threshold 10V, and the signal may subsequently be adopted for charging as the input signal 10V/2 A (20 W) of the power management chip.

3) If the sender does not support high-voltage quick charging and supports output of a wireless signal of maximally 10V, for example, 5V/2 A, the receiver may regulate the current of the received wireless signal to obtain a charging signal of 5V/1.25 A according to the current magnitude supported by it, voltage and current conversion is not required to be performed at this moment, and the charging signal is directly adopted for charging as the input signal of the power management chip.

By the abovementioned implementation mode, the voltage conversion coefficient may be determined based on of the output power supported by the wireless charger and the voltages supported by the power management chip, thereby determining whether to perform voltage and current conversion on the charging signal, avoiding unnecessary processing and improving the charging efficiency.

Figure 1C:
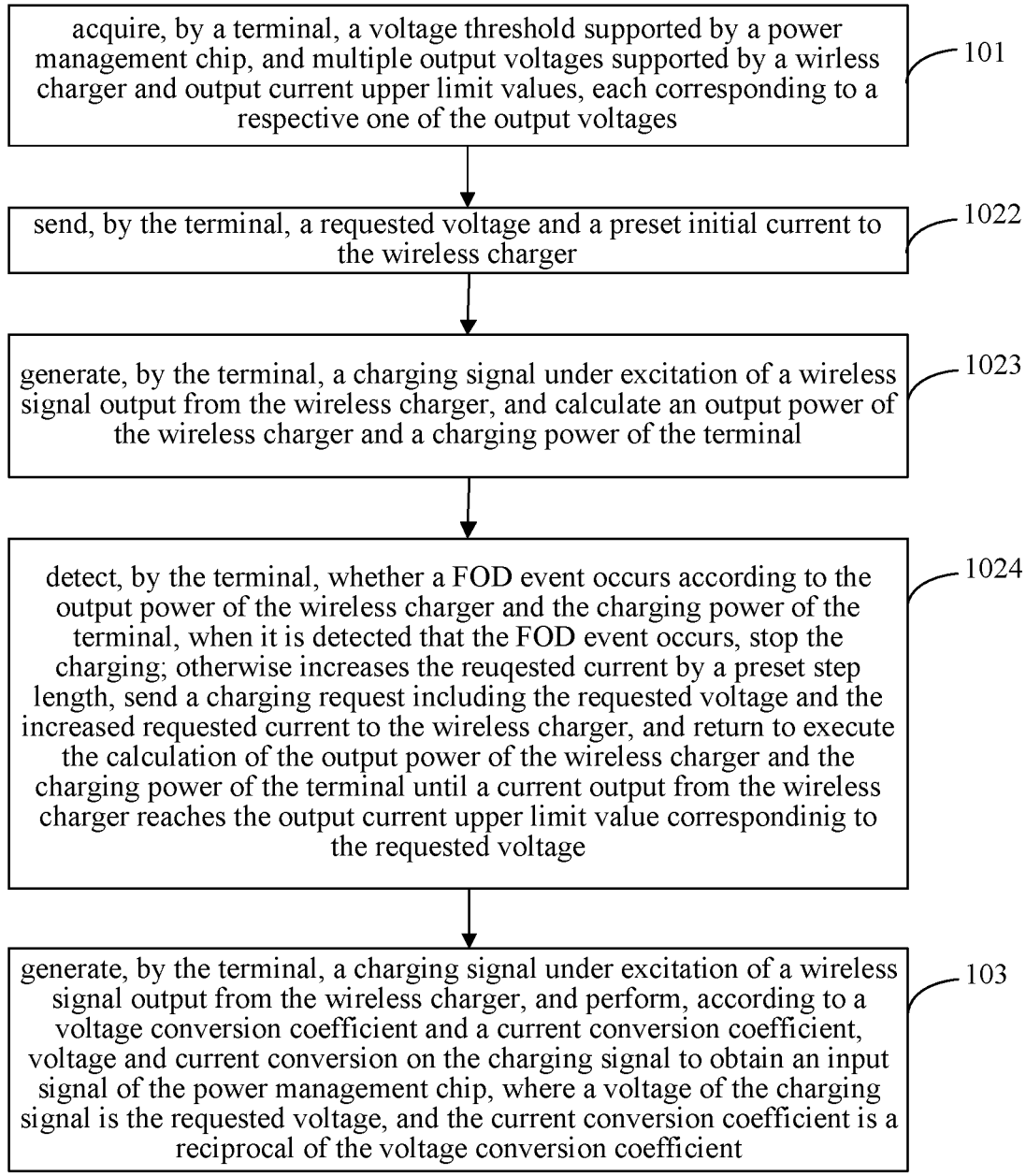

Furthermore, after the requested voltage and the voltage conversion coefficient are determined, the solution for determining the requested current may be implemented by multiple implementation modes. For example, the terminal may interact and negotiate for many times with the wireless charger to determine the final requested current. Correspondingly, as shown in FIG. 1C, FIG. 1C is a flow chart showing a method for wireless charging, according to another example. Based on of any abovementioned implementation mode, Step 102 may include the following steps.

In Step 1022, the terminal sends the requested voltage and a preset initial current to the wireless charger.

In Step 1023, the terminal generates a charging signal under excitation of a wireless signal output from the wireless charger, and calculates output power of the wireless charger and charging power of the terminal.

In Step 1024, the terminal detects whether a Foreign Object Detection (FOD) event occurs according to the output power of the wireless charger and the charging power of the terminal. When it is detected that the FOD event occurs, charging is stopped, otherwise the requested current is increased by a preset step length, a charging request including the requested voltage and the increased requested current is sent to the wireless charger and returns to the calculation the output power of the wireless charger and the charging power of the terminal until a current output from the wireless charger reaches the output current upper limit value corresponding to the requested voltage.

For example, in the practical scenario: after the requested voltage is determined according to the output power of the wireless charger and the voltage conversion coefficient, the terminal sends the requested voltage and the preset initial current to the wireless charger, the initial current at this moment is usually relatively low, the wireless charger outputs the wireless signal according to the requested voltage and initial current sent by the terminal, and the terminal generates the charging signal according to the wireless signal output from the wireless charger, calculates the output power of the wireless charger and the charging power of the terminal respectively, detects whether the FOD event occurs according to the power, when it is detected that the FOD event occurs, gradually increases the requested current according to the preset step length, for example, 100 mA, and sends the increased requested current and the requested voltage to the wireless charger to increase the output power of the wireless charger until the current output from the wireless charger reaches the output current upper limit value corresponding to the requested voltage supported by it.

Where, FOD is a foreign object detection mechanism. For example, since a working frequency band supported by the Wireless Power Consortium (WPC) may achieve a heating effect on a metal object, if relative positions of the wireless charger and the terminal are deviated too far, the charging frequency may be reduced, heating is serious, and at this moment, FOD may be triggered. Correspondingly, when the FOD event is detected, charging is stopped. Specifically, FOD in the solution may refer to an existing FOD solution in the field of wireless charging, and will not be elaborated in the example.

In this implementation mode, the requested current is gradually increased by multiple interactions, and high-power quick charging is implemented based on of ensuring safety in use of the parts.

Figure 1D:
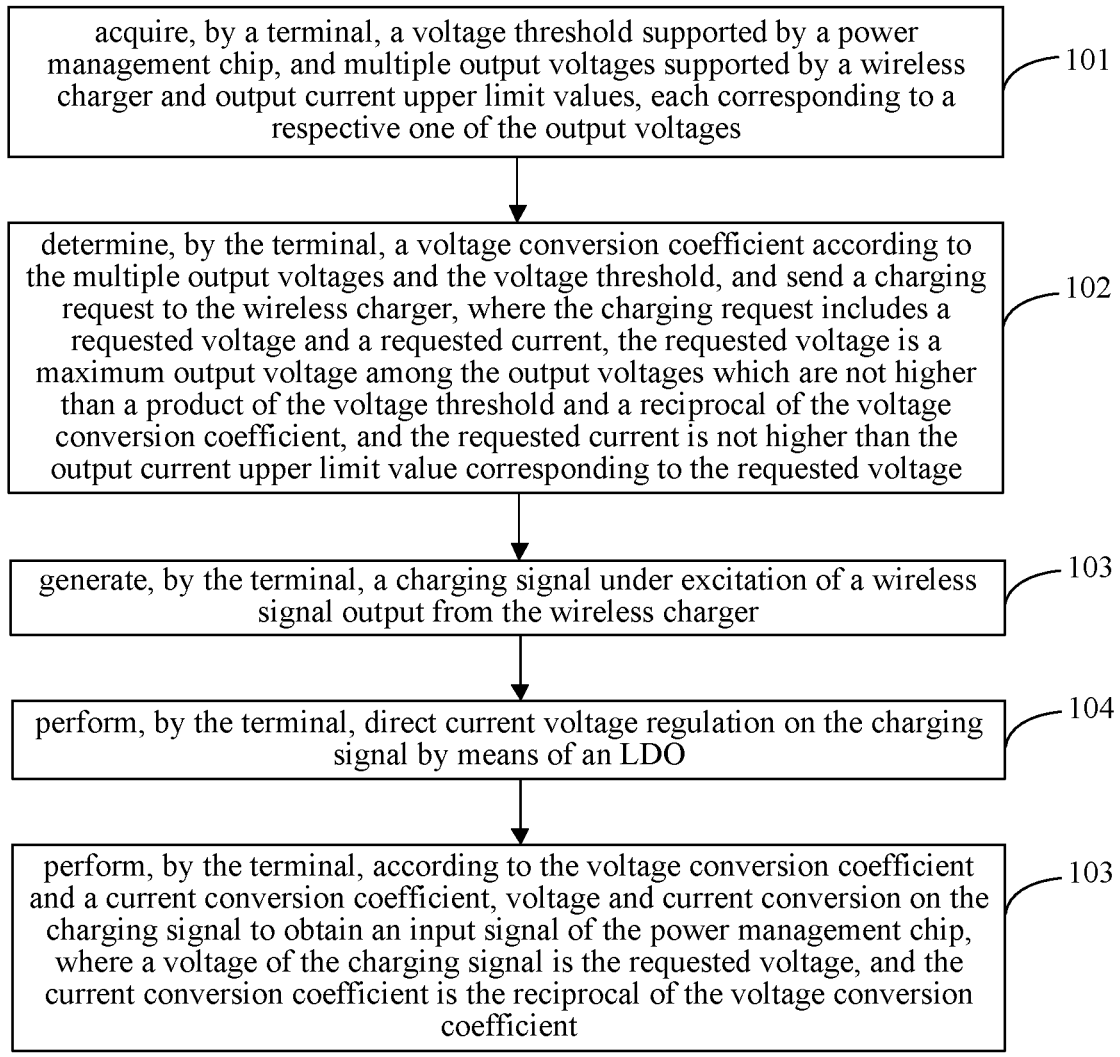

In practice, for improving charging reliability and stability and avoiding loss of the terminal, voltage regulation processing may be performed on the signal input into the voltage management chip. Optionally, as shown in FIG. 1D, FIG. 1D is a flow chart showing a method for wireless charging, according to another example. Based on of any abovementioned implementation mode, after the terminal generates the charging signal under excitation of the wireless signal output from the wireless charger in Step 103, the method may further include the following step.

In Step 104, the terminal performs direct current voltage regulation on the charging signal by means of a Low Dropout Regulator (LDO).

Specifically, the terminal generates the charging signal under excitation of the wireless signal output from the wireless charger, performs direct current voltage regulation processing on the charging signal by means of the LDO, and further performs, according to the voltage conversion coefficient and the current conversion coefficient, voltage and current conversion processing on the charging signal subjected to voltage regulation processing to obtain the input signal of the power management chip, so as to implement high-power quick charging.

Furthermore, in the implementation mode, a normally working LDO has a certain limit and requirement on a current of a signal. Therefore, at this moment, the requested current is also required to be determined in combination with a current threshold supported by the LDO, that is, the current of the charging signal is required to be considered within a limit of the current threshold of the LDO. Correspondingly, based on of the implementation mode, the requested current is also required to be not higher than the current threshold supported by the LDO.

In the method for wireless charging provided by the example, when wireless charging is required, the terminal determines the requested voltage required to be requested to the wireless charger according to the product of the voltage threshold supported by the power management chip and the reciprocal of the voltage conversion coefficient, and determines the requested current required to be requested to the wireless charger based on of output power supported by the wireless charger. Compared with other methods, the requested voltage in the solution is not completely limited by the voltage threshold supported by the power management chip, so that high-power quick charging is implemented. Moreover, in the solution, before the charging signal is input to the power management chip, voltage and current conversion is performed on it at first, so that not only may a limit requirement of the power management chip be met, but also high-power quick charging may be implemented, the signal in the wireless charging process may meet both a high-power requirement and requirements of different links, charging efficiency is effectively improved, and charging time is reduced.

Figure 2A:
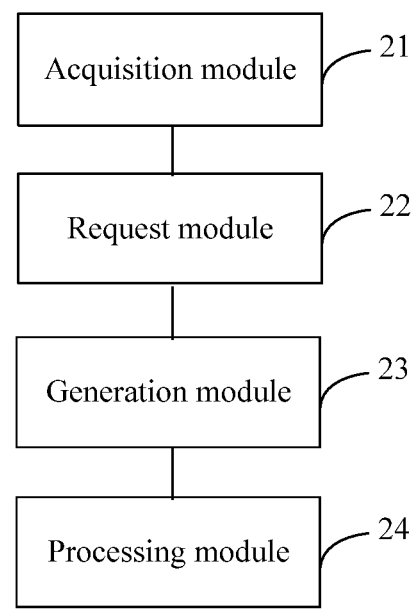
FIG. 2A to FIG. 2C are structure diagrams of a terminal, according to an example.

FIG. 2A is a structure diagram of a terminal, according to an example. As shown in FIG. 2A, the terminal may include:

an acquisition module 21, arranged to acquire a voltage threshold supported by a power management chip, and multiple output voltages supported a wireless charger and output current upper limit values, each corresponding to a respective one of the output voltages;

a request module 22, arranged to determine a voltage conversion coefficient according to the multiple output voltages and the voltage threshold, and send a charging request to the wireless charger, where the charging request includes a requested voltage and a requested current, the requested voltage is a maximum output voltage among the output voltages which are not higher than a product of the voltage threshold and a reciprocal of the voltage conversion coefficient, and the requested current is not higher than the output current upper limit value corresponding to the requested voltage;

a generation module 23, arranged to generate a charging signal under excitation of a wireless signal output from the wireless charger; and a processing module 24, arranged to perform, according to the voltage conversion coefficient and a current conversion coefficient, voltage and current conversion on the charging signal to obtain an input signal of the power management chip, where a voltage of the charging signal is the requested voltage, and the current conversion coefficient is the reciprocal of the voltage conversion coefficient.

In practice, the terminal may be any piece of equipment supporting wireless charging, for example, an intelligent mobile phone, a personal computer and a tablet computer. The wireless charger may be any piece of equipment capable of outputting a wireless signal arranged for wireless charging. For example, the wireless charger may include a charger and a wireless sender.

For example, in a practical scenario: when wireless charging is required, the acquisition module 21 acquires the voltage threshold supported by the power management chip of the terminal, and different output voltages supported by the wireless charger and output current upper limit values, each corresponding to a respective one of the output voltages. The request module 22 determines the voltage conversion coefficient according to the acquired voltage threshold and output voltages, the voltage conversion coefficient may be preset here, and specifically, the voltage conversion coefficient is not larger than 1. The request module 22 sends the charging request to the wireless charger, the charging request including the requested voltage and the requested current, where a magnitude of the requested voltage depends on the maximum output voltage of the product of the voltage threshold and the reciprocal of the voltage conversion coefficient, where the requested current is not higher than the current upper limit value corresponding to the requested voltage. After the request module 22 sends the charging request, the generation module 23 generates the charging signal under excitation of the wireless signal output from the wireless charger, and the processing module 24 converts the voltage and current of the charging signal to obtain the input signal meeting a requirement of the power management chip according to the voltage conversion coefficient and the current conversion coefficient forming a reciprocal relationship with the voltage conversion coefficient, so as to implement high-power quick charging.

Figure 2B:
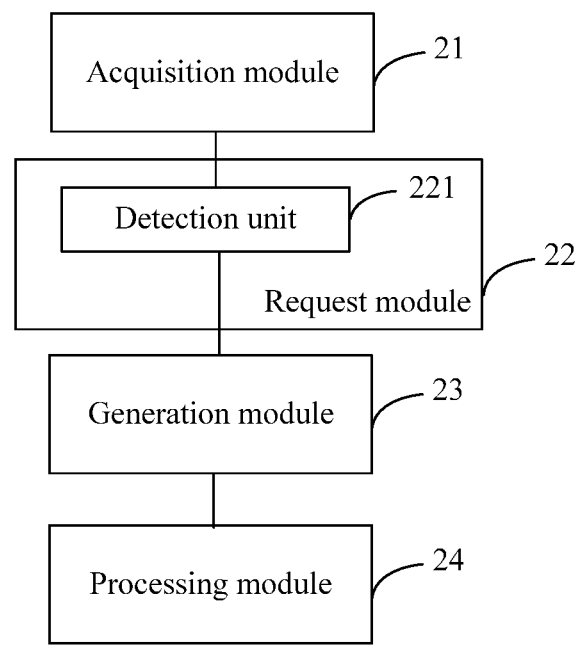

Where, whether conversion is required to be performed may be determined according to output power supported by the wireless charger and the voltage threshold supported by the power management chip. Correspondingly, as shown in FIG. 2B, FIG. 2B is a structure diagram of a terminal, according to another example. Based on of the implementation mode shown in FIG. 2A, the request module 22 may include:

a detection unit 211, arranged to detect whether the maximum output voltage among the multiple output voltages is higher than the voltage threshold, and when it is detected that the maximum output voltage among the multiple output voltages is higher than the voltage threshold, determine that the voltage conversion coefficient is a preset value smaller than 1, otherwise determine that the voltage conversion coefficient is 1.

Specifically, when the wireless charger supports high-power output, the power of the charging signal generated by the generation module 23 under excitation of the wireless signal output from the wireless charger is also relatively high, the detection unit 211 sets the voltage conversion coefficient to be a value smaller than 1, and then the processing module 24 performs voltage conversion on the charging signal according to a certain conversion ratio to make the voltage of the signal subjected to voltage conversion not higher than the voltage threshold, and meanwhile, performs current conversion on the charging signal according to an opposite conversion ratio to keep the characteristic of high power of the converted signal. Therefore, the input signal of the power management chip is obtained.

More specifically, when the wireless charger only supports low-power output, the power of the charging signal generated by the generation module 23 under excitation of the wireless signal output from the wireless charger is also relatively low, and is usually within a voltage requirement range of the power management chip, and correspondingly, for such a signal, if the voltage of the charging signal does not exceed the voltage threshold supported by the power management chip, conversion is not required to be performed, the detection unit 211 sets the voltage conversion coefficient to be 1, and then the processing module 24 directly determines the charging signal as the input signal of the power management chip. Therefore, the input signal of the power management chip is obtained. In practice, the processing module 24 may adopt a charge pump to perform voltage and current conversion on the charging signal.

By the abovementioned implementation mode, the voltage conversion coefficient may be determined based on of the output power supported by the wireless charger and the voltages supported by the power management chip, thereby determining whether to perform voltage and current conversion on the charging signal, avoiding unnecessary processing and improving the charging efficiency.

Figure 2C:
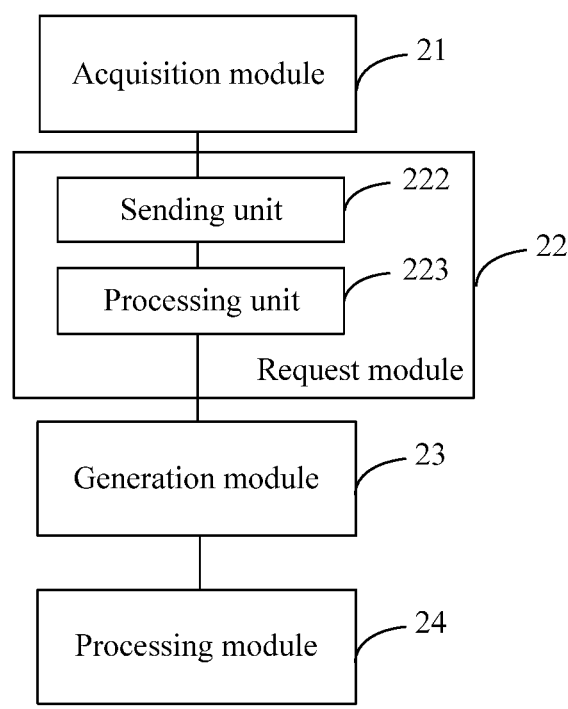

Furthermore, after the requested voltage and the voltage conversion coefficient are determined, the solution for determining the requested current may be implemented by multiple implementation modes. For example, the terminal may interact and negotiate for many times with the wireless charger to determine the final requested current. Correspondingly, as shown in FIG. 2C, FIG. 2C is a structure diagram of a terminal, according to another example. Based on of any abovementioned implementation mode, the request module 22 may include:

a sending module 222, arranged for the terminal to send the requested voltage and a preset initial current to the wireless charger, the generation module 23 being specifically arranged to generate a charging signal under excitation of a wireless signal output from the wireless charger, and calculate output power of the wireless charger and charging power of the terminal respectively; and a processing unit 223, arranged to detect whether a FOD event occurs according to the output power of the wireless charger and the charging power of the terminal, when it is detected that the FOD event occurs, stop the charging; otherwise increase the requested current by a preset step length, send a charging request including the requested voltage and the increased requested current to the wireless charger and indicate the generation module 23 to re-execute the step of calculating the output power of the wireless charger and the charging power of the terminal respectively until a current output from the wireless charger reaches the output current upper limit value corresponding to the requested voltage.

For example, in the practical scenario: after the request module 22 determines the requested voltage according to the output power of the wireless charger and the voltage conversion coefficient, the sending unit 222 sends the requested voltage and the preset initial current to the wireless charger, the initial current at this moment is usually relatively low, the wireless charger outputs the wireless signal according to the requested voltage and initial current sent by the terminal, the generation module 23 generates the charging signal according to the wireless signal output from the wireless charger, and calculates the output power of the wireless charger and the charging power of the terminal respectively, and the processing unit 223 detects whether the FOD event occurs according to the power, when it is detected that the FOD event occurs, gradually increases the requested current according to the preset step length, for example, 100 mA, and sends the increased requested current and the requested voltage to the wireless charger to increase the output power of the wireless charger until the current output from the wireless charger reaches the output current upper limit value corresponding to the requested voltage supported by it.

In this implementation mode, the requested current is gradually increased by multiple interactions, and high-power quick charging is implemented based on of ensuring safety in use of the parts.

In practice, for improving charging reliability and stability and avoiding loss of the terminal, voltage regulation processing may be performed on the signal input into the voltage management chip. Optionally, based on of any abovementioned implementation mode, the terminal further includes:

a voltage regulation module, arranged to perform direct current voltage regulation on the charging signal by means of an LDO.

Specifically, the generation module 23 generates the charging signal under excitation of the wireless signal output from the wireless charger, the voltage regulation module performs direct current voltage regulation processing on the charging signal by means of the LDO, and the processing module 24 performs, according to the voltage conversion coefficient and the current conversion coefficient, voltage and current conversion processing on the charging signal subjected to voltage regulation processing of the voltage regulation module to obtain the input signal of the power management chip, so as to implement high-power quick charging.

Furthermore, in the implementation mode, a normally working LDO has a certain limit and requirement on a current of a signal. Therefore, at this moment, the requested current is also required to be determined in combination with a current threshold supported by the LDO, that is, the current of the charging signal is required to be considered within a limit of the current threshold of the LDO. Correspondingly, based on of the implementation mode, the requested current is also required to be not higher than the current threshold supported by the LDO.

According to the terminal provided by the example, when wireless charging is required, the terminal determines the requested voltage required to be requested to the wireless charger according to the product of the voltage threshold supported by the power management chip and the reciprocal of the voltage conversion coefficient, and determines the requested current required to be requested to the wireless charger based on of output power supported by the wireless charger. Compared with other implementations, the requested voltage in the solution is not completely limited by the voltage threshold supported by the power management chip, so that high-power quick charging is implemented. Moreover, in the solution, before the charging signal is input to the power management chip, voltage and current conversion is performed on it at first, so that not only may a limit requirement of the power management chip be met, but also high-power quick charging may be implemented, the signal in the wireless charging process may meet both a high-power requirement and requirements of different links, charging efficiency is effectively improved, and charging time is reduced.

The terminal described above is arranged to execute the abovementioned method for wireless charging.

Figure 3:
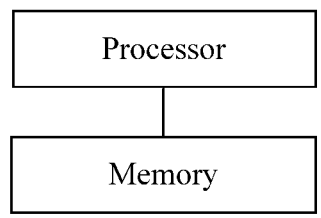
FIG. 3 is a block diagram of a terminal, according to an example.

As shown in FIG. 3, FIG. 3 is a block diagram of a terminal, according to an example. As shown in FIG. 3, the terminal may be implemented as:

a processor; and a memory arranged to store a computer program, where the processor runs the computer program to execute the steps of the method for wireless charging of any abovementioned example.

According to the terminal provided by the example, when wireless charging is required, the terminal determines a requested voltage required to be requested to a wireless charger according to a product of a voltage threshold supported by a power management chip and a reciprocal of a voltage conversion coefficient, and determines a requested current required to be requested to the wireless charger based on of output power supported by the wireless charger. Compared with other implementations, the requested voltage in the solution is not completely limited by the voltage threshold supported by the power management chip, so that high-power quick charging is implemented. Moreover, in the solution, before a charging signal is input to the power management chip, voltage and current conversion is performed on it at first, so that not only may a limit requirement of the power management chip be met, but also high-power quick charging may be implemented, the signal in a wireless charging process may meet both a high-power requirement and requirements of different links, charging efficiency is effectively improved, and charging time is reduced.

Figure 4:
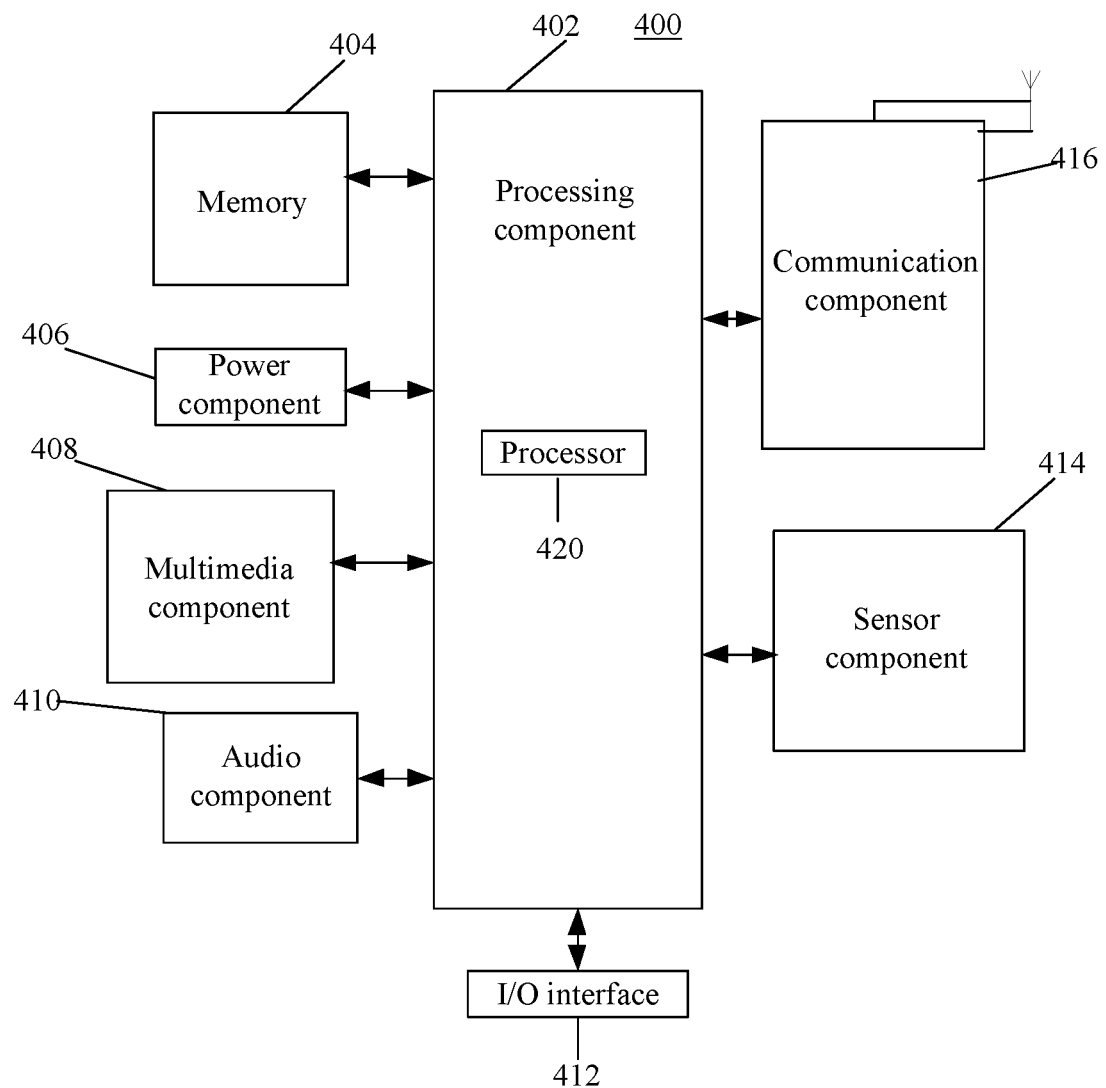
FIG. 4 is a block diagram of a terminal 400, according to an example.

FIG. 4 is a block diagram of a terminal 400, according to an example. For example, the terminal 400 may be a mobile phone, a computer, a tablet, a personal digital assistant and the like.

Referring to FIG. 4, the terminal 400 may include one or more of the following components: a processing component 402, a memory 404, a power component 406, a multimedia component 408, an audio component 510, an Input/Output (I/O) interface 412, a sensor component 414, and a communication component 416.

The processing component 402 typically controls overall operations of the terminal 400, such as the operations associated with display, telephone calls, data communications, camera operations, and recording operations. The processing component 402 may include one or more processors 420 to execute instructions to perform all or part of the steps in the abovementioned method. Moreover, the processing component 402 may include one or more modules which facilitate interaction between the processing component 402 and the other components. For instance, the processing component 402 may include a multimedia module to facilitate interaction between the multimedia component 408 and the processing component 402.

The memory 404 is arranged to store various types of data to support the operation of the terminal 400. Examples of such data include instructions for any application programs or methods operated on the terminal 400, contact data, phonebook data, messages, pictures, video, etc. The memory 404 may be implemented by any type of volatile or nonvolatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 provides power for various components of the terminal 400. The power component 406 may include a power management system, one or more power supplies, and other components associated with the generation, management and distribution of power for the terminal 400.

The multimedia component 408 includes a screen providing an output interface between the terminal 400 and a user. In some examples, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some examples, the multimedia component 408 includes a front camera and/or a rear camera. The front camera and/or the rear camera may receive external multimedia data when the terminal 400 is in an operation mode, such as a photographing mode or a video mode. Each of the front camera and the rear camera may be a fixed optical lens system or have focusing and optical zooming capabilities.

The audio component 410 is arranged to output and/or input an audio signal. For example, the audio component 410 includes a Microphone (MIC), and the MIC is arranged to receive an external audio signal when the terminal 400 is in the operation mode, such as a call mode, a recording mode and a voice recognition mode. The received audio signal may be further stored in the memory 404 or sent through the communication component 416. In some examples, the audio component 410 further includes a speaker arranged to output the audio signal.

The I/O interface 412 provides an interface between the processing component 402 and a peripheral interface module, and the peripheral interface module may be a keyboard, a click wheel, a button and the like. The button may include, but not limited to: a home button, a volume button, a starting button and a locking button.

The sensor component 414 includes one or more sensors arranged to provide status assessment in various aspects for the terminal 400. For instance, the sensor component 414 may detect an on/off status of the terminal 400 and relative positioning of components, such as a display and small keyboard of the terminal 400, and the sensor component 414 may further detect a change in a position of the terminal 400 or a component of the terminal 400, presence or absence of contact between the user and the terminal 400, orientation or acceleration/deceleration of the terminal 400 and a change in temperature of the terminal 400. The sensor component 414 may include a proximity sensor arranged to detect presence of an object nearby without any physical contact. The sensor component 414 may also include a light sensor, such as a Complementary Metal Oxide Semiconductor (CMOS) or Charge Coupled Device (CCD) image sensor, arranged for use in an imaging application. In some examples, the sensor component 414 may also include an acceleration sensor, a gyroscope sensor, a magnetic sensor, a pressure sensor or a temperature sensor.

The communication component 416 is arranged to facilitate wired or wireless communication between the terminal 400 and other equpment. The terminal 400 may access a communication-standard-based wireless network, such as a Wireless Fidelity (WiFi) network, a 2nd-Generation (2G) or 3rd-Generation (3G) network or a combination thereof. In an example, the communication component 416 receives a broadcast signal or broadcast associated information from an external broadcast management system through a broadcast channel. In an example, the communication component 416 further includes a Near Field Communciation (NFC) module to facilitate short-range communication. For example, the NFC module may be implemented based on of a Radio Frequency Identification (RFID) technology, an Infrared Data Association (IrDA) technology, an Ultra-WideBand (UWB) technology, a Bluetooth (BT) technology and another technology.

In an example, the terminal 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is arranged to execute the abovementioned method.

In an example, there is also provided a non-transitory computer-readable storage medium including an instruction, such as the memory 404 including an instruction, and the instruction may be executed by the processor 420 of the terminal 400 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

A non-transitory computer-readable storage medium is provided, in which a computer program is stored, the program being executed by a processor to implement the steps of the method for wireless charging of any abovementioned example.

Figure 5:
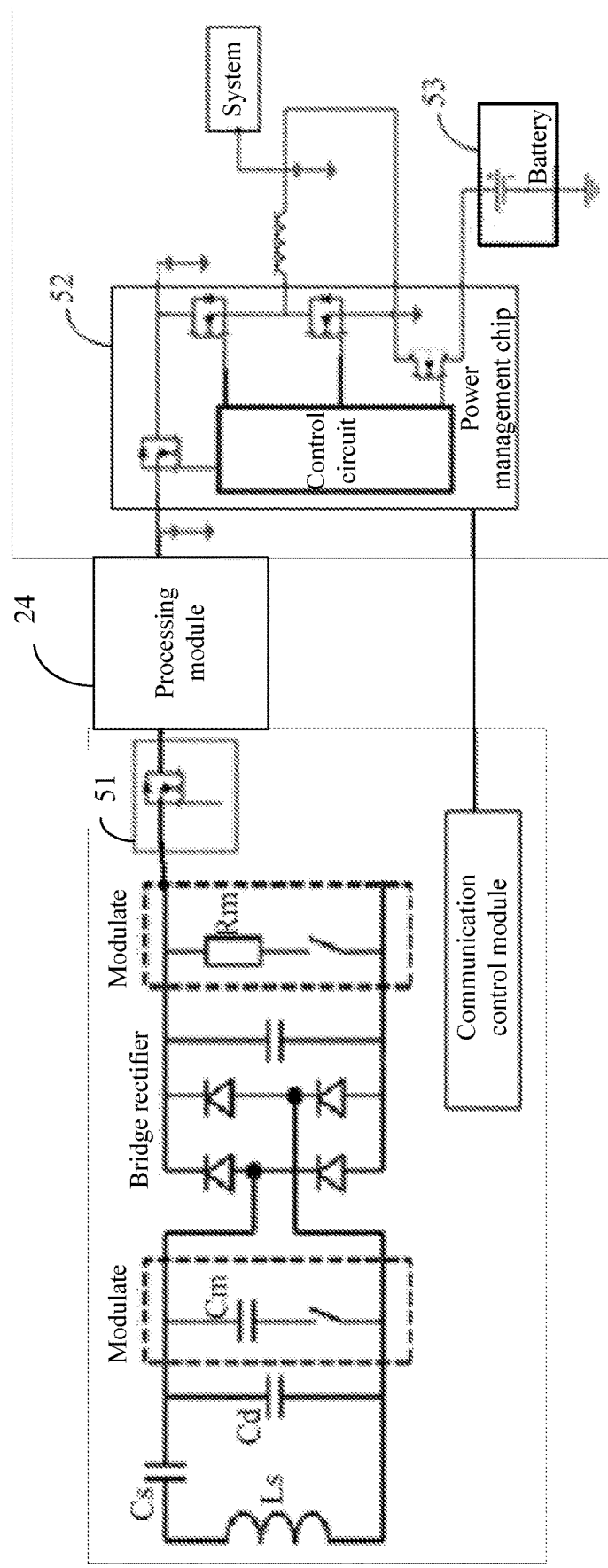
FIG. 5 is a structure diagram of fa terminal, according to an example.

FIG. 5 is a practical structure diagram of a terminal, according to an example. As shown in FIG. 5, based on of the abovementioned example, the terminal further includes: an LDO 51, a power management chip 52 and a battery 53, where the LDO 51 is arranged to receive a charging signal generated by the terminal, the LDO 51 is connected with the processing module 24, the processing module 24 is connected with the power management chip 52, and the power management chip 52 is connected with the battery 53; and the power management chip 52 is arranged to charge the battery 53 according to an input signal obtained by the processing module 24.

Specifically, after generating the charging signal under excitation of the wireless signal output from the wireless charger, the terminal performs voltage regulation processing through the LDO, and outputs it to the processing module 24 of the terminal, the processing module 24, before providing the charging signal for the power management chip, processes it at first to make a voltage of the processed signal meet a requirement of the power management chip, namely not exceed a voltage threshold of an input voltage supported by the power management chip, and simultaneously increase a current of the signal, and then provides the processed signal for the power management chip 52 as the input signal of the power management chip 52, and the power management chip 52 charges the battery 53, and may also supply power to a system of the terminal. In practice, the terminal may further include a communication and control module, and the module may implement information transmission between the abovementioned modules and control the power management chip 52 to charge.

Furthermore, each module in the terminal may specifically be implemented by a specific circuit shown in FIG. 5, where Ls is a receiving coil, Cs is a series capacitor, Cd is a detection capacitor corresponding to a certain frequency, for example, 1 MHz, Cm is a modulation capacitor and Rm is a load modulation resistor. A bridge rectifier is arranged to rectify an alternating current signal into a direct current signal, and the communication and control module is arranged to control each module and communicate with the power management chip. The signal output from the LDO is subjected to voltage and current conversion of the processing module 24 for use as the input signal of the power management chip 52. According to the input signal, the power management chip 52 is responsible for charging the battery 53 and supplying power to the system. It is important to note that the specific circuit shown in the figure is only an exemplary implementation mode and not intended to limit other implementation modes of each module.

According to the terminal provided by the example, when wireless charging is required, the terminal determines a requested voltage required to be requested to a wireless charger according to a product of the voltage threshold supported by the power management chip and a reciprocal of a voltage conversion coefficient, and determines a requested current required to be requested to the wireless charger based on of output power supported by the wireless charger. Compared with other implementations, the requested voltage in the solution is not completely limited by the voltage threshold supported by the power management chip, so that high-power quick charging is implemented. Moreover, in the solution, before the charging signal is input to the power management chip, voltage and current conversion is performed on it at first, so that not only may a limit requirement of the power management chip be met, but also high-power quick charging may be implemented, the signal in the wireless charging process may meet both a high-power requirement and requirements of different links, charging efficiency is effectively improved, and charging time is reduced.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Those skilled in the art may clearly know that, for convenient and simple description, a specific working process of the terminal may refer to the corresponding process in the abovementioned method example.

Other examples of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof.

What is claimed is:

1. A method for wireless charging, the method comprising:
   acquiring, by a terminal, a voltage threshold supported by a power management chip, a plurality of output voltages supported by a wireless charger, and output current upper limit values of the wireless charger, wherein each of the output current upper limit values corresponds to one of the output voltages;
   determining, by the terminal, a voltage conversion coefficient according to the plurality of output voltages and the voltage threshold, and sending a charging request to the wireless charger, wherein the charging request comprises a requested voltage and a requested current, wherein the requested voltage is a maximum output voltage among the output voltages which are not higher than a product of the voltage threshold and a reciprocal of the voltage conversion coefficient, and the requested current is not higher than the output current upper limit value corresponding to the requested voltage; and
   generating, by the terminal, a charging signal under excitation of a wireless signal output from the wireless charger, and performing, according to the voltage conversion coefficient and a current conversion coefficient, conversion of voltage and current on the charging signal to obtain an input signal of the power management chip, wherein the charging signal has a voltage that is the requested voltage, and the current conversion coefficient is a reciprocal of the voltage conversion coefficient.

2. The method of claim 1, wherein determining, by the terminal, the voltage conversion coefficient according to the plurality of output voltages and the voltage threshold comprises:
   detecting, by the terminal, whether a maximum output voltage among the plurality of output voltages is higher than the voltage threshold; when it is detected that the maximum output voltage among the plurality of output voltages is higher than the voltage threshold, determining that the voltage conversion coefficient is a preset value smaller than 1, otherwise determining that the voltage conversion coefficient is 1.

3. The method of claim 1, wherein determining, by the terminal, the voltage conversion coefficient according to the plurality of output voltages and the voltage threshold and sending the charging request to the wireless charger comprises:

sending, by the terminal, the requested voltage and a preset initial current to the wireless charger;

generating, by the terminal, the charging signal under excitation of the wireless signal output from the wireless charger, and calculating an output power of the wireless charger and a charging power of the terminal; and detecting, by the terminal, whether a Foreign Object Detection (FOD) event occurs according to the output power of the wireless charger and the charging power of the terminal; when it is detected that the FOD event occurs, stopping the charging; otherwise, increasing the requested current by a preset step length, sending a charging request comprising the requested voltage and the increased requested current to the wireless charger, and returning to execute the calculation of the output power of the wireless charger and the charging power of the terminal, until a current output from the wireless charger reaches the output current upper limit value corresponding to the requested voltage.

4. The method of claim 1, after generating, by the terminal, the charging signal under excitation of the wireless signal output from the wireless charger, further comprising:
performing, by the terminal, direct current voltage regulation on the charging signal by means of a Low Dropout Regulator (LDO).

5. The method of claim 2, after generating, by the terminal, the charging signal under excitation of the wireless signal output from the wireless charger, further comprising:
performing, by the terminal, direct current voltage regulation on the charging signal by means of a Low Dropout Regulator (LDO).

6. The method of claim 3, after generating, by the terminal, the charging signal under excitation of the wireless signal output from the wireless charger, further comprising:
performing, by the terminal, direct current voltage regulation on the charging signal by means of a Low Dropout Regulator (LDO).

7. The method of claim 4, wherein the requested current is not higher than a current threshold supported by the LDO.

8. A terminal, comprising:
a processor; and
a memory arranged to store an instruction executable by the processor,
wherein the processor is arranged to:
acquire, by a terminal, a voltage threshold supported by a power management chip, a plurality of output voltages supported by a wireless charger, and output current upper limit values of the wireless charger, wherein each of output current upper limit values corresponds to one of the output voltages;
determine, by the terminal, a voltage conversion coefficient according to the plurality of output voltages and the voltage threshold, and sending a charging request to the wireless charger, wherein the charging request comprises a requested voltage and a requested current, wherein the requested voltage is a maximum output voltage among the output voltages which are not higher than a product of the voltage threshold and a reciprocal of the voltage conversion coefficient, and the requested current is not higher than the output current upper limit value corresponding to the requested voltage; and
generate, by the terminal, a charging signal under excitation of a wireless signal output from the wireless charger, and performing, according to the voltage conversion coefficient and a current conversion coefficient, conversion of voltage and current on the charging signal to obtain an input signal of the power management chip, wherein the charging signal has a voltage that is the requested voltage, and the current conversion coefficient is a reciprocal of the voltage conversion coefficient.

9. The terminal of claim 8, wherein the processor configured to determine, by the terminal, the voltage conversion coefficient according to the plurality of output voltages and the voltage threshold is further arranged to:
detect, by the terminal, whether a maximum output voltage among the plurality of output voltages is higher than the voltage threshold; when it is detected that the maximum output voltage among the plurality of output voltages is higher than the voltage threshold, determine that the voltage conversion coefficient is a preset value smaller than 1, otherwise determine that the voltage conversion coefficient is 1.

10. The terminal of claim 8, wherein the processor configured to determine, by the terminal, the voltage conversion coefficient according to the plurality of output voltages and the voltage threshold and send the charging request to the wireless charger is further arranged to:
send, by the terminal, the requested voltage and a preset initial current to the wireless charger;
generate, by the terminal, the charging signal under excitation of the wireless signal output from the wireless charger, and calculate an output power of the wireless charger and a charging power of the terminal; and
detect, by the terminal, whether a Foreign Object Detection (FOD) event occurs according to the output power of the wireless charger and the charging power of the terminal; when it is detected that the FOD event occurs, stop the charging; otherwise, increase the requested current by a preset step length, send a charging request comprising the requested voltage and the increased requested current to the wireless charger, and return to execute the calculation of the output power of the wireless charger and the charging power of the terminal, until a current output from the wireless charger reaches the output current upper limit value corresponding to the requested voltage.

11. The terminal of claim 8, wherein, after generating, by the terminal, the charging signal under excitation of the wireless signal output from the wireless charger, the processor is further arranged to:
perform, by the terminal, direct current voltage regulation on the charging signal by means of a Low Dropout Regulator (LDO).

12. The terminal of claim 9, wherein, after generating, by the terminal, the charging signal under excitation of the wireless signal output from the wireless charger, the processor is further arranged to:
perform, by the terminal, direct current voltage regulation on the charging signal by means of a Low Dropout Regulator (LDO).

13. The terminal of claim 10, wherein, after generating, by the terminal, the charging signal under excitation of the wireless signal output from the wireless charger, the processor is further arranged to:
perform, by the terminal, direct current voltage regulation on the charging signal by means of a Low Dropout Regulator (LDO).

14. The terminal of claim 11, wherein the requested current is not higher than a current threshold supported by the LDO.

15. A non-transitory computer-readable storage medium, in which a computer program is stored, wherein the computer program is executed by a processor to implement:

acquiring, by a terminal, a voltage threshold supported by a power management chip, a plurality of output voltages supported by a wireless charger, and output current upper limit values of the wireless charger, wherein each of the output current upper limit values corresponds to one of the output voltages;

determining, by the terminal, a voltage conversion coefficient according to the plurality of output voltages and the voltage threshold, and sending a charging request to the wireless charger, wherein the charging request comprises a requested voltage and a requested current, wherein the requested voltage is a maximum output voltage among the output voltages which are not higher than a product of the voltage threshold and a reciprocal of the voltage conversion coefficient, and the requested current is not higher than the output current upper limit value corresponding to the requested voltage; and generating, by the terminal, a charging signal under excitation of a wireless signal output from the wireless charger, and performing, according to the voltage conversion coefficient and a current conversion coefficient, conversion of voltage and current on the charging signal to obtain an input signal of the power management chip, wherein the charging signal has a voltage that is the requested voltage, and the current conversion coefficient is a reciprocal of the voltage conversion coefficient.

16. The storage medium of claim 15, wherein the computer program executed to implement determining, by the terminal, the voltage conversion coefficient according to the plurality of output voltages and the voltage threshold comprises is further executed to implement:

detecting, by the terminal, whether a maximum output voltage among the plurality of output voltages is higher than the voltage threshold; when it is detected that the maximum output voltage among the plurality of output voltages is higher than the voltage threshold, determining that the voltage conversion coefficient is a preset value smaller than 1, otherwise determining that the voltage conversion coefficient is 1.

17. The storage medium of claim 15, wherein the computer program executed to implement determining, by the terminal, the voltage conversion coefficient according to the plurality of output voltages and the voltage threshold and sending the charging request to the wireless charger is further executed to implement:

sending, by the terminal, the requested voltage and a preset initial current to the wireless charger;

generating, by the terminal, the charging signal under excitation of the wireless signal output from the wireless charger, and calculating an output power of the wireless charger and a charging power of the terminal; and detecting, by the terminal, whether a Foreign Object Detection (FOD) event occurs according to the output power of the wireless charger and the charging power of the terminal; when it is detected that the FOD event occurs, stopping the charging; otherwise, increasing the requested current by a preset step length, sending a charging request comprising the requested voltage and the increased requested current to the wireless charger, and returning to execute the calculation of the output power of the wireless charger and the charging power of the terminal, until a current output from the wireless charger reaches the output current upper limit value corresponding to the requested voltage.

18. The storage medium of claim 15, wherein, after generating, by the terminal, the charging signal under excitation of the wireless signal output from the wireless charger, the computer program is further executed to implement:

performing, by the terminal, direct current voltage regulation on the charging signal by means of a Low Dropout Regulator (LDO).

19. The storage medium of claim 16, wherein, after generating, by the terminal, the charging signal under excitation of the wireless signal output from the wireless charger, computer program is further executed to implement:

performing, by the terminal, direct current voltage regulation on the charging signal by means of a Low Dropout Regulator (LDO).

20. The storage medium of claim 17, wherein, after generating, by the terminal, the charging signal under excitation of the wireless signal output from the wireless charger, computer program is further executed to implement:

performing, by the terminal, direct current voltage regulation on the charging signal by means of a Low Dropout Regulator (LDO).

* * * * *